(12) United States Patent
Baek et al.

(10) Patent No.: US 12,489,809 B2
(45) Date of Patent: Dec. 2, 2025

(54) METHOD, DEVICE, AND SYSTEM FOR OPTIMIZING LOAD BALANCING ALGORITHM ACCORDING TO APPLICATION

(71) Applicant: Samsung Electronics Co., Ltd., Suwon-si (KR)

(72) Inventors: Hosung Baek, Suwon-si (KR); Shinsoo Yun, Suwon-si (KR); Minkyo Jung, Suwon-si (KR); Jiyeon Yoon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/521,553

(22) Filed: Nov. 28, 2023

(65) Prior Publication Data

US 2024/0323251 A1    Sep. 26, 2024

(30) Foreign Application Priority Data

Mar. 24, 2023 (KR) .................. 10-2023-0039199
Apr. 18, 2023 (KR) .................. 10-2023-0050900

(51) Int. Cl.
*H04L 67/1004* (2022.01)

(52) U.S. Cl.
CPC .................. *H04L 67/1004* (2013.01)

(58) Field of Classification Search
CPC ............. H04L 67/1004; H04L 67/1008; H04L 67/1029
See application file for complete search history.

(56) References Cited

U.S. PATENT DOCUMENTS

| | | | |
|---|---|---|---|
| 7,181,524 B1 * | 2/2007 | Lele | H04L 67/1012 |
| | | | 709/224 |
| 7,787,370 B1 | 8/2010 | Aweya et al. | |
| 9,577,940 B2 | 2/2017 | Childress et al. | |
| 11,240,294 B2 | 2/2022 | Balasubramanian et al. | |
| 2004/0103194 A1 * | 5/2004 | Islam | H04L 67/1008 |
| | | | 709/225 |
| 2006/0155862 A1 | 7/2006 | Kathi et al. | |

(Continued)

FOREIGN PATENT DOCUMENTS

| | | |
|---|---|---|
| CN | 1744593 A | 3/2006 |
| CN | 103023815 A | 4/2013 |
| KR | 101392479 B1 | 5/2014 |

*Primary Examiner* — Benjamin M Thieu
(74) *Attorney, Agent, or Firm* — Harness, Dickey & Pierce, P.L.C.

(57) ABSTRACT

A method, device, and system for providing a load balancing algorithm according to an application are provided. The method includes calculating values of a plurality of application characteristics based on first service load information for a first application, evaluating a plurality of application impact scores for each of a plurality of load balancing algorithms, the plurality of application impact scores indicating a degree to which each of the plurality of application characteristics impacts each of the plurality of load balancing algorithms, and providing a first load balancing algorithm from among the plurality of load balancing algorithms based on the values of the plurality of application characteristics and the plurality of application impact scores.

20 Claims, 15 Drawing Sheets

(56) References Cited

U.S. PATENT DOCUMENTS

| | | | | |
|---|---|---|---|---|
| 2012/0041970 A1* | 2/2012 | Ghosh | .................. | H04L 67/568 |
| | | | | 707/769 |
| 2012/0042322 A1 | 2/2012 | Arvidsson et al. | | |
| 2016/0328222 A1* | 11/2016 | Arumugam | ............... | G06F 8/61 |
| 2023/0344771 A1* | 10/2023 | Manickam | .......... | H04L 47/2416 |

* cited by examiner

METHOD, DEVICE, AND SYSTEM FOR OPTIMIZING LOAD BALANCING ALGORITHM ACCORDING TO APPLICATION

CROSS-REFERENCE TO RELATED APPLICATION

This application is based on and claims priority under 35 U.S.C. § 119 to Korean Patent Application Nos. 10-2023-0039199, filed on Mar. 24, 2023, and 10-2023-0050900, filed on Apr. 18, 2023, in the Korean Intellectual Property Office, the disclosures of each of which are incorporated by reference herein in their entireties.

BACKGROUND

The inventive concepts relate to electronic devices, and more specifically to methods, devices, and systems for optimizing (or determining suitable) load balancing algorithms according to applications.

With the development of digital processing devices and communication networks (e.g., the Internet), various data may be transmitted and received through communication networks. Among various digital processing devices connected to these communication networks, a digital processing device that provides data is referred to as a server, and a digital processing device that requests data and receives data is referred to as a client.

In a system including servers and clients, one server processes requests from a plurality of clients or a plurality of servers process requests from a plurality of clients. When a plurality of servers process a request from a client, an optimal (or selected, determined, etc.) server may process a request of the client according to a state of a server having a small throughput, a communication network, etc., in order to smoothly and efficiently process the request from the client. As such, determining the optimal server (or determining the server) from among the plurality of servers to process the client's request may be referred to as load balancing.

Furthermore, with the development of virtualization technology, various applications are being served. Applications have several different characteristics. If an algorithm for performing load balancing is applied in a system including servers and clients, the load may not be well distributed to servers serving the application.

SUMMARY

According to an aspect of the inventive concepts, there is provided a method, device, and system for setting an optimal (or suitable) load balancing algorithm in consideration of characteristics of applications.

According to an aspect of the inventive concepts, there is provided a method including calculating values of a plurality of application characteristics based on first service load information for a first application, evaluating a plurality of application impact scores for each of a plurality of load balancing algorithms, the plurality of application impact scores indicating a degree to which each of the plurality of application characteristics impacts each of the plurality of load balancing algorithms, and providing a first load balancing algorithm from among the plurality of load balancing algorithms based on the values of the plurality of application characteristics and the plurality of application impact scores.

In addition, according to an aspect of the inventive concepts, there is provided a device that performs load balancing including processing circuitry configured to evaluate a plurality of application characteristics and a plurality of application impact scores for each of a plurality of load balancing algorithms based on first service load information for a first application, provide first load balancing algorithm from among the plurality of load balancing algorithms based on the plurality of application characteristics and the plurality of application impact scores, and perform load balancing according to the first load balancing algorithm.

According to an aspect of the inventive concepts, there is provided a system including a server group configured to process an application service in response to an application service request signal requesting a service provided through an application, and a load balancing device configured to calculate a plurality of application characteristics and a plurality of application impact scores for each of a plurality of load balancing algorithms based on service load information about an application, selecting a first load balancing algorithm from among the plurality of load balancing algorithms based on the plurality of application characteristics and the plurality of application impact scores, perform load balancing according to the first load balancing algorithm, and transmit the application service request signal to a target server of the server group.

According to an aspect of the inventive concepts, there is provided a method including evaluating a plurality of application characteristics for a first application and a plurality of application impact scores based on first service load information for the first application, each respective application impact score among the plurality of application impact scores being associated with an impact of a corresponding application characteristic among the plurality of application characteristics on a respective load balancing algorithm among a plurality of load balancing algorithms, selecting a first load balancing algorithm from among the plurality of load balancing algorithms based on the plurality of application characteristics and the plurality of application impact scores, and executing load balancing according to the first load balancing algorithm.

BRIEF DESCRIPTION OF THE DRAWINGS

Embodiments of the inventive concepts will be more clearly understood from the following detailed description taken in conjunction with the accompanying drawings in which.

DETAILED DESCRIPTION

Hereinafter, embodiments of the inventive concepts will be described in detail with reference to the accompanying drawings.

Figure 1:
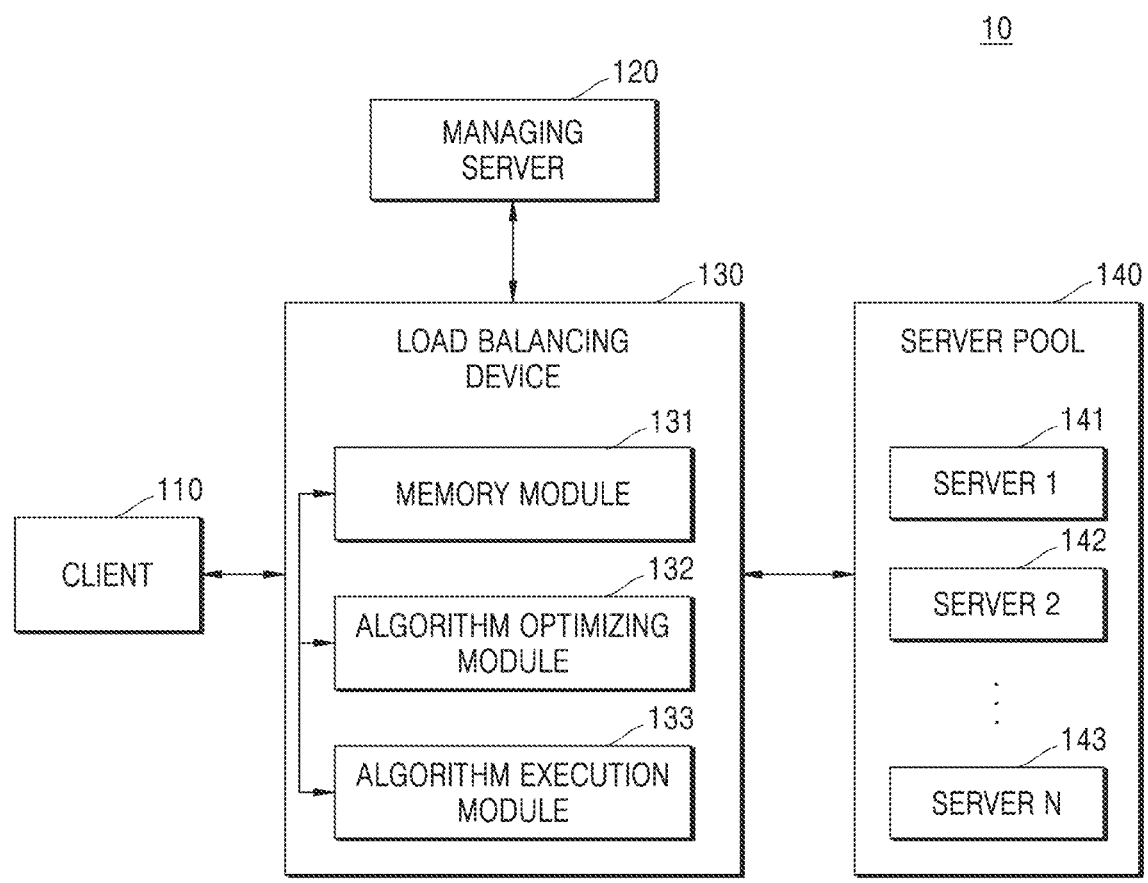
FIG. 1 is a block diagram illustrating a system according to embodiments.

FIG. 1 is a block diagram illustrating a system 10 according to embodiments.

Referring to FIG. 1, the system 10 may include a client 110, a managing server 120, a load balancing device 130, and/or a server pool 140. The client 110, the managing server 120, the load balancing device 130, and the server pool 140 may communicate with each other through a wired network or a wireless network.

The client 110 may include (or be implemented as) a terminal accessible to a communication network. For example, the client 110 may include (or be implemented as) an artificial intelligence voice recognition device, a smart home appliance, a laptop, and/or a desktop, as well as a mobile terminal capable of wired and wireless communication. The mobile terminal may include (or be implemented as), for example, a smartphone, a tablet personal computer (PC), a wearable device, and the like.

In embodiments, the client 110 may use an application operated by the system 10 and transmit an application service request signal to the load balancing device 130. The application service request signal may be a signal for requesting for a service provided through an application.

In embodiments, the client 110 may receive a response signal to the application service request signal from the load balancing device 130 or the server pool 140.

The managing server 120 may be a server that manages an application.

The load balancing device 130 may perform load balancing by using a load balancing algorithm. Load balancing may mean distributing tasks (loads) to be handled by a specific server to a plurality of servers and processing the distributed tasks (loads) by the plurality of servers. The load balancing is performed to prevent the load from being (or reduce the extent to which the load is) concentrated on one server and to ensure that each server has optimal (or higher) performance. The load balancing algorithm may be an algorithm that determines that an optimal (or suitable) server from among a plurality of servers processes a request from the client 110. According to embodiments, the term "optimal server" as used herein may refer to a server determined as a most suitable server from among the plurality of servers to process the request. When the load balancing algorithm is executed, the load balancing device 130 may determine a target server of the server pool 140. The target server may process the application service request signal. The load balancing device 130 may transmit, to the target server, the application service request signal transmitted from the client 110.

In embodiments, the load balancing device 130 may evaluate a plurality of application characteristics and a plurality of application impact scores of each load balancing algorithm based on service load information, first list information, and second list information. In addition, the load balancing device 130 may select the optimal load balancing algorithm from among a plurality of load balancing algorithms based on the plurality of application characteristics and the plurality of application impact scores. According to embodiments, the term "optimal load balancing algorithm" as used herein may refer to a load balancing algorithm determined as a most suitable load balancing algorithm from among the plurality of load balancing algorithms to determine the optimal server to process a request corresponding to a particular application.

The service load information may include various information that may be determined when the system 10 executes the application. For example, the service load information may include the number of total servers capable of executing an application, the number of entire sessions for a time period, a total amount of traffic for a time period, the maximum (or highest) number of sessions at the time when peak traffic occurs, the session time of each session, and/or the amount of traffic at a specific time, as shown in Table 1 below. Here, the session may be a connection state between the client 110 and the server pool 140.

TABLE 1

| Symbol | Description |
|---|---|
| $N^T$ | Total number of sessions (e.g., entire sessions) for a predetermined (or alternatively, given) time period (e.g., sessions performed during the time period) (for example, 1 day) |
| $N^S$ | Total number of servers that may execute (e.g., configured to execute) an application |
| $N_P^T$ | Maximum (or highest) number of sessions at a time point when peak traffic occurs |
| $N^G$ | Amount of the whole traffic (or total amount of traffic) for a time period (for example, 1 day) |
| $t_k$ | Session time of session k (k is any number), e.g., session time of each session |
| $v_l$ | Amount of traffic at a specific time (e.g., a time point l) |

The first list information may include a list of the plurality of application characteristics. For example, each of the plurality of application characteristics may include a session time level, a session number level, a traffic level, and/or a peak traffic level, as shown in Table 2 below.

TABLE 2

| Symbol | Description |
|---|---|
| $T_i$ | Session time level, for a specific application i (or a service i), which indicates the time to maintain the session as a level |
| $C_i$ | Session number level, for a specific application i, which indicates the number of sessions per server as a level |
| $M_i$ | A traffic level, for a specific application i, indicating the amount of traffic per session as a level |
| $P_i$ | A peak traffic level, for a specific application i, indicating the frequency of occurrence of peak traffic as a level |

The second list information may include a list of the plurality of load balancing algorithms. In embodiments, the types of load balancing algorithms may be divided into static load balancing algorithms and dynamic load balancing algorithms.

The static load balancing algorithms may be algorithms that distribute traffic according to a fixed rule regardless of the current server state. For example, a round Robin method, a weighted round Robin method, an Internet Protocol (IP) hash algorithm, and the like may be included among the static load balancing algorithms.

The dynamic load balancing algorithms may be algorithms that distribute traffic after considering (or checking) the current state of each server. For example, a Least Connection Method, a Weighted Least Connection Method, a Least Response Time Method, a Least Load First Method, a Least Traffic First Method, a Least Weighted Load First Method, a Response Time Monitoring Method, a Fewest Task Method, a Resource-Based Method, and the like may be included among the dynamic load balancing algorithms.

The application impact score may be a parameter indicating a degree to which each application characteristic impacts a load balancing algorithm. For example, the first application impact score may be a parameter indicating a degree to which the first application characteristic impacts the load balancing algorithm, and the second application impact score may be a parameter indicating a degree to which the second application characteristic impacts the load balancing algorithm. For each load balancing algorithm, a plurality of application impact scores may be calculated. For example, the plurality of application impact scores for each load balancing (LB) algorithm may be expressed as shown in Table 3 below.

TABLE 3

| LB algorithm list | Algorithm impact score |
| --- | --- |
| IP hash Method ($A_1$) | $A_1^T, A_1^C, A_1^M, A_1^P$ |
| Least Connection Method ($A_2$) | $A_2^T, A_2^C, A_2^M, A_2^P$ |
| . . . | |
| Round Robin Method ($A_j$) | $A_j^T, A_j^C, A_j^M, A_j^P$ |

In Table 3, $A_s^T$ may be a first impact score of the session time level impacting on the load balancing algorithm s. $A_s^C$ may be a second impact score of the session number level impacting on the load balancing algorithm s. $A_s^M$ may be a third impact score of the traffic level impacting on the load balancing algorithm s. $A_s^P$ may be a fourth impact score of the peak traffic level impacting on the load balancing algorithm s. Here, s may be any integer included in the range of 1 or more to j or less in Table 3, and j may be an integer of 2 or more.

In embodiments, the load balancing device 130 may include a memory module 131, an algorithm optimizing module 132, and/or an algorithm execution module 133.

The memory module 131 may store data indicating various types of information. For example, the memory module 131 may store a plurality of pieces of data indicating service load information, first list information, and second list information, respectively. In embodiments, the memory module 131 may include first service load information for the first application. The first application may be an application already known to the system 10 or currently serviced by the system 10.

In embodiments, the algorithm optimizing module 132 may evaluate a plurality of application characteristics and a plurality of application impact scores of each load balancing algorithm based on the first service load information, the first list information, and the second list information. In addition, the algorithm optimizing module 132 may provide (e.g., determine) the optimal load balancing algorithm from among a plurality of load balancing algorithms based on the plurality of application characteristics and the plurality of application impact scores of each load balancing algorithm.

The algorithm execution module 133 may perform load balancing according to the optimal load balancing algorithm. For example, the algorithm execution module 133 may receive an application service request signal from the client 110. In addition, the algorithm execution module 133 may select a target server to process the application service request signal from the server pool 140 using the optimal load balancing algorithm. In addition, the algorithm execution module 133 may transmit the application service request signal to the target server.

In embodiments, the memory module 131, the algorithm optimizing module 132, and/or the algorithm execution module 133 may be implemented as a virtual machine. In embodiments, the memory module 131, the algorithm optimizing module 132, and/or the algorithm execution module 133 may be implemented with physical hardware such as memory and processors.

The server pool 140 may include a plurality of servers 141, 142, and 143 (e.g., a first server 141, a second server 142 and an Nth server 143). Each of the plurality of servers 141, 142, and 143 may process an application service in response to the application service request signal. Each of the plurality of servers 141, 142, and 143 may transmit a response signal indicating a processing result to the client 110 through the load balancing device 130 or directly. The server pool 140 may be referred to as a server group. N may be an integer of 2 or more.

The system 10 according to the inventive concepts may be implemented as a cloud-based system, but is not limited thereto.

As mentioned above, there is an effect of efficiently managing and operating traffic by performing optimal (or improved) load balancing according to the characteristics of the application.

Figure 2:
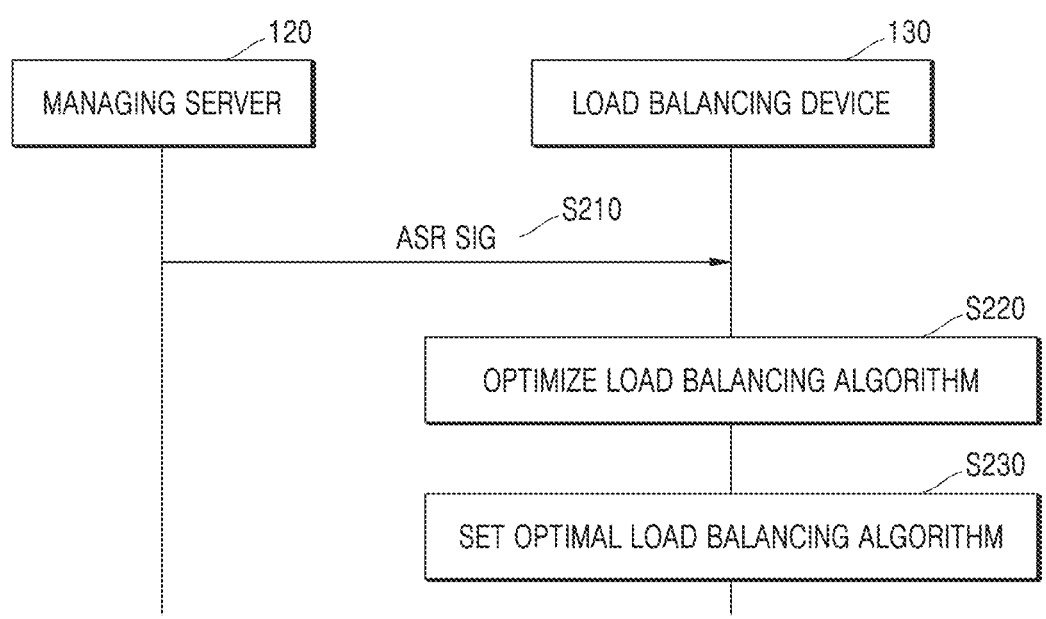
FIG. 2 is a diagram illustrating operations of a managing server and a load balancing device according to embodiments.

FIG. 2 is a diagram illustrating operations of a managing server 120 and a load balancing device 130 according to embodiments.

Referring to FIGS. 1 and 2, in operation S210, the managing server 120 may transmit a load balancing service request signal ASR SIG to the load balancing device 130 for the currently serviced application. The load balancing service request signal ASR SIG may be a signal requesting for a load balancing algorithm.

In operation S220, the load balancing device 130 may optimize the load balancing algorithm (e.g., determine the optimal load balancing algorithm) in response to the load balancing service request signal ASR SIG.

In operation S230, the load balancing device 130 may set an optimal load balancing algorithm (e.g., set the determined optimal load balancing algorithm). For example, the load balancing device 130 may store information including an optimal load balancing algorithm for the currently serviced application.

Hereinafter, a method of providing a load balancing algorithm optimized for an application will be described later.

Figure 3:
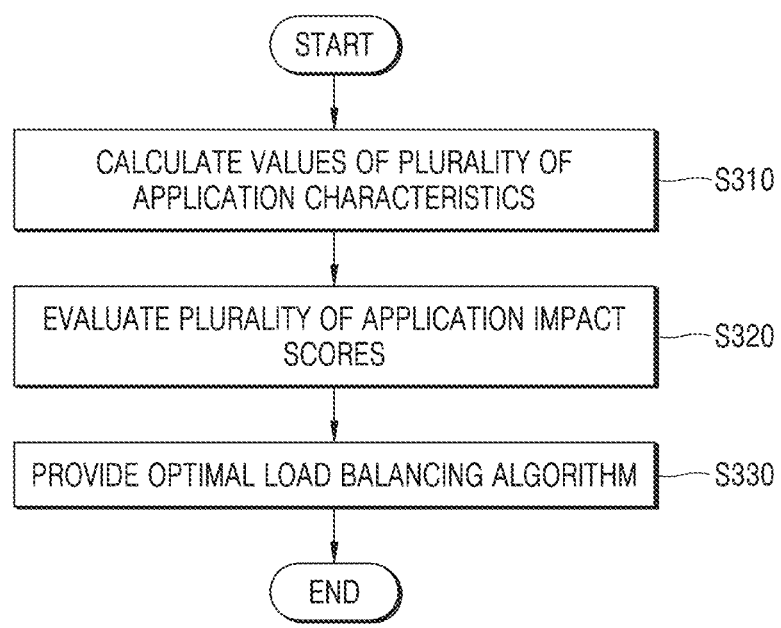
FIG. 3 is a flowchart illustrating a method of providing an optimal (or suitable) load balancing algorithm according to embodiments.

FIG. 3 is a flowchart illustrating a method of providing an optimal load balancing algorithm according to embodiments.

Referring to FIGS. 1, 2, and 3, the method of providing the optimal load balancing algorithm may be carried out by the load balancing device 130 of FIG. 2.

An operation of calculating values of a plurality of application characteristics is performed (S310). For example, the algorithm optimizing module 132 may calculate the values of the plurality of application characteristics based on the first service load information for the first application and the first list information including a list of the plurality of application characteristics.

An operation of evaluating a plurality of application impact scores is performed (S320). A plurality of application impact scores may indicate a degree in which each of the plurality of application characteristics impacts on each load balancing algorithm. For example, the algorithm optimizing module 132 may evaluate the plurality of application impact scores for each load balancing algorithm based on first list information and second list information including a list of the plurality of load balancing algorithms.

An operation of providing an optimal load balancing algorithm is performed (S330). For example, the algorithm optimizing module 132 may provide the optimal load balancing algorithm from among the plurality of load balancing algorithms based on the values of the plurality of application characteristics and the plurality of application impact scores.

In embodiments for operation S330, the plurality of load balancing algorithms may include a static load balancing algorithm and a dynamic load balancing algorithm. In addition, in operation S330, either a static load balancing algorithm or a dynamic load balancing algorithm may be provided as an optimal load balancing algorithm. For example, there may be a situation in which the number of sessions per server is relatively less and a time when the session is maintained (e.g., session time) is relatively long. In this situation, load balancing according to the static load balancing algorithm may cause unbalancing and maintain an unbalanced state. In this case, the dynamic load balancing algorithm may be suitable for the above-described situation rather than the static load balancing algorithm. Accordingly, the algorithm optimizing module 132 may set the dynamic load balancing algorithm as an optimal load balancing algorithm. However, embodiments are not limited thereto. When the static load balancing algorithm is suitable, the algorithm optimizing module 132 may set the static load balancing algorithm as the optimal load balancing algorithm.

In embodiments, the method of FIG. 3 may further include transmitting the application service request signal provided from the client to a server (e.g., a target server) selected from among the plurality of servers according to the optimal load balancing algorithm. According to embodiments, the target server may serve the first application by, for example, performing a processing task requested by the first application (e.g., a processing task corresponding to the application service request signal), and return a result of the processing task to the first application (e.g., to the client 110 and/or the managing server 120).

As described above, there is an effect of efficiently managing traffic.

Meanwhile, in the system 10, a situation in which traffic per session is different and the session maintenance time is long may occur. For example, the number of sessions of the first server 141 in the server pool 140 is less than the number of sessions of the second server 142, but the amount of traffic of the first server 141 may be greater than the amount of traffic of the second server 142. That is, since the amount of traffic is different for each session, a load imbalance phenomenon may occur. In addition, for example, if the session list of the N-th server 143 continues to be maintained over time, the load imbalance phenomenon may continue to be maintained. In this case, the static load balancing algorithm may be suitable for the load balancing algorithm (e.g., a minimum (or lowest) load priority method, a minimum (or lowest) task method, etc.) that considers the traffic situation of the server, rather than a load balancing algorithm (e.g., a least connection method) that simply considers only the number of sessions. Therefore, embodiments provide for selecting an optimal load balancing algorithm in consideration of the characteristics of the application such as session and/or traffic.

Figure 4:
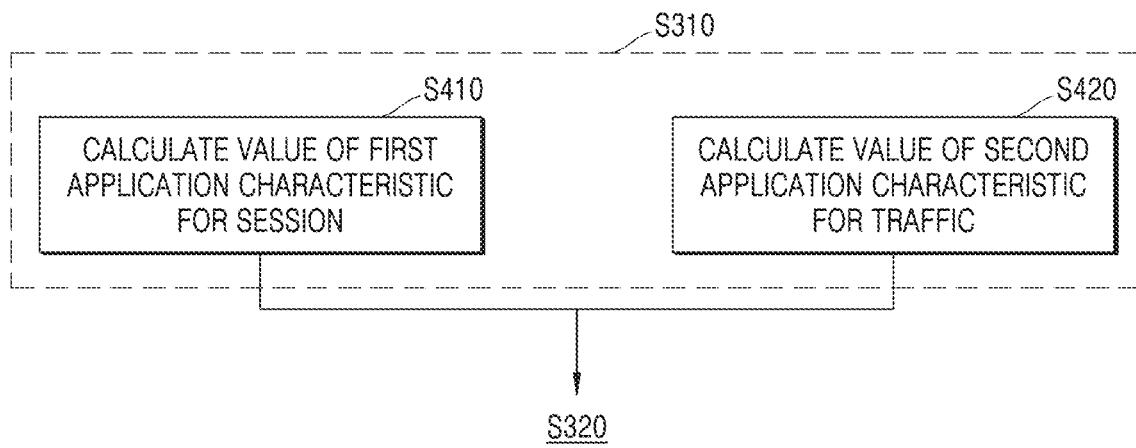
FIG. 4 is a flowchart illustrating some examples of operation S310 of FIG. 3.

FIG. 4 is a flowchart illustrating some examples of operation S310 of FIG. 3.

Referring to FIG. 4, operation S310 of FIG. 3 may include operations S410 and/or S420 of FIG. 4. In embodiments, operations S410 and S420 may be performed in parallel as shown in FIG. 4, but embodiments are not limited thereto. In embodiments, operations S410 and S420 may be sequentially performed.

An operation of calculating a value of a first application characteristic for a session is performed by using the first service load information (S410). The first service load information may include various parameters described in Table 1. The first application characteristics for the session may include, for example, a session time level and/or a session number level.

An operation of calculating a value of a second application characteristic for traffic by using the first service load information is performed (S420). The second application characteristic for traffic may include, for example, a traffic level and/or a peak traffic level.

Figure 5:
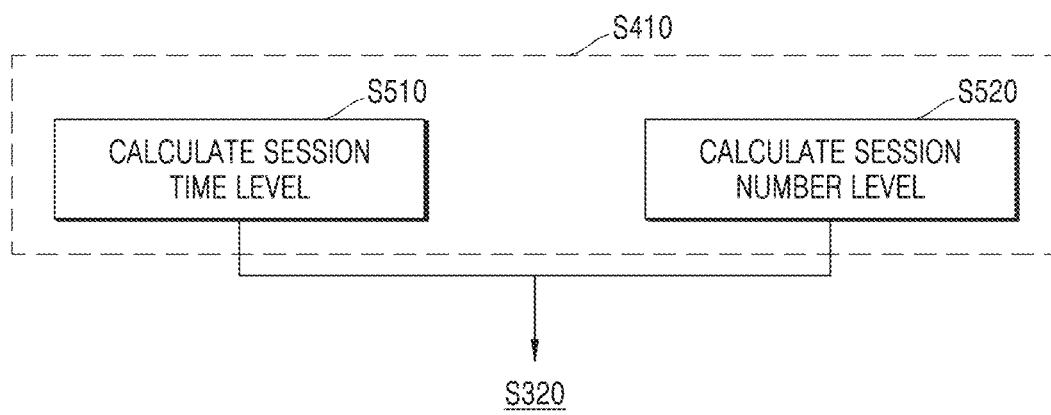
FIG. 5 is a flowchart illustrating some examples of operation S410 of FIG. 4.

FIG. 5 is a flowchart illustrating some examples of operation S410 of FIG. 4.

Referring to FIG. 5, operation S410 of FIG. 4 may include operations S510 and/or S520 of FIG. 5. In embodiments, operations S510 and S520 may be performed in parallel. In embodiments, operations S510 and S520 may be sequentially performed.

The service load information may include the total number of servers $N^S$, the total number of sessions $N^T$ for a predetermined (or alternatively, given) time period (e.g., 24 hours), the total amount of traffic $N^G$, the maximum (or highest) number of sessions $N_P^T$ at a time when peak traffic occurs, and the session time $t_k$ of each session. Each server may execute an application i.

An operation of calculating the session time level is performed (S510). In embodiments, the algorithm optimizing module 132 may calculate the session time level by using the total number of sessions ($N^T$), the session times of the entire session (or each of the sessions) (e.g., a session time of session k ($t_k$), and/or at least one first reference value.

The session time level may have any one of two or more levels. For example, the session time level $T_i$ of the application i may be calculated according to Equation 1 below.

$$T_i = \begin{cases} 1, & \text{if } \alpha_i > r_{u1} \\ 0.5, & \text{if } r_{u1} \geq \alpha_i > r_{u2} \\ 0, & \text{otherwise} \end{cases} \quad \text{[Equation 1]}$$

In Equation 1, $\alpha_i$ is a value for the ratio of the number of sessions with relatively long session time to the total number of sessions, and may be calculated as the sum of the first indicator $x_k$ and the ratio of the entire session $N^T$ as shown in Equation 2 below.

$$\alpha_i = \frac{\sum x_k}{N^T}, x_k = \begin{cases} 1, & \text{if } t_k > t_u \\ 0, & \text{otherwise} \end{cases} \quad \text{[Equation 2]}$$

In Equation 2, the first indicator $x_k$ may be a value indicating whether or not the session time $t_k$ of session k is greater than the reference session time $t_u$. For example, if the session time $t_k$ of session k is greater than the reference session time $t_u$, the value of the first indicator $x_k$ may be "1", otherwise the value of the first indicator $x_k$ may be "0". However, embodiments are not limited thereto, and in embodiments, values other than "0" and "1" may be applied as a value of the first indicator $x_k$.

In Equation 1, the number of first reference values may be two (e.g., $r_{u1}$ and $r_{u2}$). Accordingly, the session time level may have any one of three levels. In addition, the three levels may be "0", "0.5", and "1", respectively. If the session time level is "1", the session time level is relatively high, if the session time level is "0.5", the session time level is moderate, and if the session time level is "0", the session time level may be relatively low. However, the types of levels sorted according to the number of first reference values (or the number of levels sorted) and the specific values of Equation 1 are examples and not limited thereto. In embodiments, for the type of level, if the number of first reference values is one (e.g., $r_{u1}$ or $r_{u2}$), there may be two types of levels. Alternatively, there may be four or more types of levels. In the case of the specific values of Equation 1, other values other than "0", "0.5", and "1" may be applied to Equation 1.

An operation of calculating the session number level is performed (S520). In embodiments, the algorithm optimizing module 132 may calculate the session number level by using the total number of servers $N^S$, the total number of sessions $N^T$, the maximum (or highest) number of sessions NP at the time when peak traffic occurs, the total amount of traffic $N^G$ and/or at least one second reference value.

The session number level may have any one of two or more levels. For example, the session number level $C_i$ of the application i may be calculated according to Equation 3 below.

$$C_i = \begin{cases} 1, & \text{if } \beta_i > b_{u1} \\ 0.5, & \text{if } b_{u1} \geq \beta_i > b_{u2} \\ 0, & \text{otherwise} \end{cases} \quad \text{[Equation 3]}$$

In Equation 3, $\beta_i$ is a value for the number of sessions compared to the number of servers, and may be calculated as shown in Equation 4 below.

$$\beta_i = a \cdot \frac{N^T}{N^S} + (1-a) \cdot \frac{N_P^T}{N^S} \quad \text{[Equation 4]}$$

There may be situations where the session is concentrated at a particular peak time (e.g., work start time, etc.) and where there is little session (or distributed, etc.) at times other than the particular peak time. Therefore, both a first ratio $$\frac{N^T}{N^S}$$

of the total number of servers $N^S$ to the total number of sessions $N^T$, and a second ratio $$\frac{N_P^T}{N^S}$$

of the total number of servers $N^S$ to the maximum (or highest) number of sessions $N_P^T$, may be considered to calculate $\beta_i$. Meanwhile, the scaling factor $\alpha$ may be a value set to consider the importance of each of the first ratio $$\frac{N^T}{N^S}$$

and the second ratio $$\frac{N_P^T}{N^S}.$$

A value of the scaling factor $\alpha$ may be 0 or more to 1 or less.

In Equation 3, the number of second reference values is two (e.g., $b_{u1}$ and $b_{u2}$), the session number level may have any one of three levels, and the specific numbers of each of the three levels may be "0", "0.5", and "1". If the session number level is relatively high, the session number level may be "1", if the session number level is medium, the session number level may be "0.5", and if the session number level is relatively low, the session number level may be "0". However, the types of levels sorted according to the number of second reference values and the specific values of Equation 3 are examples and embodiments are not limited thereto.

A situation in which the frequency of occurrence of peak traffic varies according to an application (or an application characteristic) may occur. That is, although the average amount of traffic during a day is the same (or similar), the period of generation of peak traffic may vary according to the application characteristic. In this situation, when the IP hash method is used, users with a specific source IP are continuously assigned to the same server (or a similar server), which may lead to load unbalancing. Therefore, in order to optimize (e.g., determine a most suitable load balancing algorithm) the load balancing algorithm, application characteristics related to traffic may be considered.

Figure 6:
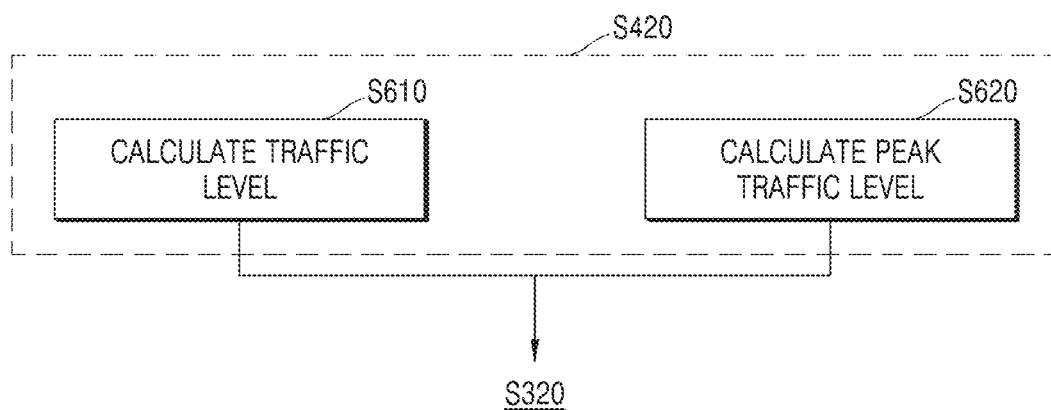
FIG. 6 is a flowchart illustrating some examples of operation S420 of FIG. 4.

FIG. 6 is a flowchart illustrating some examples of operation S420 of FIG. 4.

Referring to FIG. 6, operation S420 of FIG. 4 may include operations S610 and S620 of FIG. 6. In embodiments, operations S610 and S620 may be performed in parallel. In embodiments, operations S610 and S620 may be sequentially performed.

The service load information may include the total number of servers $N^S$ capable of executing the application i, the total number of sessions $N^T$ for a predetermined (or alternatively, given) time period (e.g., 24 hours), the total amount of traffic $N^G$ for a predetermined (or alternatively, given) time period, and/or the amount of traffic $v_l$ at a specific time l.

An operation of calculating the traffic level (also referred to herein as a first traffic level) is performed (S610). In embodiments, the algorithm optimizing module 132 may calculate the traffic level by using the total number of sessions $N^T$, the total amount of traffic $N^G$, and/or at least one third reference value.

The traffic level may have any one of two or more levels. For example, the traffic level $M_i$ of the application i may be calculated according to Equation 5 below.

$$M_i = \begin{cases} 1, & \text{if } \gamma_i > m_u \\ 0, & \text{otherwise} \end{cases} \quad \text{[Equation 5]}$$

In Equation 5, the number of third reference values may be one (e.g., mu). Accordingly, the traffic level may have any one of two levels. In addition, the two levels may be "0" and "1", respectively. When the traffic level is "1", the traffic level may be relatively high, and when the traffic level is "0", the traffic level may be relatively low. However, the number of the third reference values and the specific values of Equation 5 are examples and embodiments are not limited thereto. In embodiments, the number of third reference values is two or more, and other values other than "0" and/or "1" may be applied to Equation 1.

In Equation 5, $\gamma_i$ is a value for the average amount of traffic per session, and may be calculated as a ratio of the total number of sessions $N^T$ to the total amount of traffic $N^G$ as shown in Equation 6 below.

$$\gamma_i = \frac{N^G}{N^T} \quad \text{[Equation 6]}$$

An operation of calculating the peak traffic level is performed (S620). In embodiments, the algorithm optimizing module 132 may calculate the peak traffic level by using the traffic level (e.g., $M_i$), the amount of traffic $v_l$ at a specific time l, and/or at least one fourth reference value.

The peak traffic level may have any one of two or more levels. For example, the peak traffic level $P_i$ of the application i may be calculated according to Equation 7 below.

$$P_i = \begin{cases} 1, & \text{if } \delta_i > o_{u1} \\ 0.5, & \text{if } o_{u1} \geq \delta_i > o_{u2} \\ 0, & \text{otherwise} \end{cases} \quad \text{[Equation 7]}$$

In Equation 7, $\delta_i$ is a value for the degree of peak traffic, and may be calculated as the sum of a second indicator $y_l$ as shown in Equation 8 below.

$$\delta_i = \sum y_l, \; y_l = \begin{cases} 1, & \text{if } \frac{v_l}{\gamma_i} > h_u \text{ and } v_l > v_u \\ 0, & \text{otherwise} \end{cases} \quad \text{[Equation 8]}$$

In Equation 8, if the ratio $$\frac{v_l}{\gamma_i}$$

of the average amount of traffic per session $\gamma_i$ to the amount of traffic $v_l$ at a specific time l is greater than a reference ratio $h_u$, and if the amount of traffic $v_l$ at a specific time l is greater than the reference traffic $v_u$, the value of the second indicator $y_l$ may be "1", otherwise the value of the second indicator $y_l$ may be "0". However, embodiments are not limited thereto, and in embodiments, values other than "0" and "1" may be applied as a value of the second indicator $y_l$.

In Equation 7, the number of fourth reference values is two (e.g., $o_{u1}$ and $o_{u2}$), the peak traffic level may have any one of three levels, and the specific numbers of each of the three levels may be "0", "0.5", and "1". If the peak traffic level is relatively high, the peak traffic level may be "1", if the peak traffic level is medium, the peak traffic level may be "0.5", and if the peak traffic level is relatively low, the peak traffic level may be "0". However, the number of the fourth reference values and the specific values of Equation 7 are examples and embodiments are not limited thereto.

Meanwhile, the reference values described in Equations 1 to 7 may be defined as shown in Table 4 below.

TABLE 4

| Parameter | Description |
|---|---|
| $r_{u1}$ | A value defined by a user, and a ratio 1 of sessions with a long session time |
| $r_{u2}$ | A value defined by the user, and a ratio 2 of sessions with a long session time |
| $t_u$ | A value defined by the user, and a reference value of a long session time |
| $b_{u1}$ | A value defined by the user, and a reference value 1 of the number of sessions per server |
| $b_{u2}$ | A value defined by the user, and a reference value 2 of the number of sessions per server |
| $m_u$ | A value defined by the user, and a reference value of traffic per session |
| $h_u$ | A value defined by the user, and a reference value for a ratio greater than average traffic |
| $o_{u1}$ | A value defined by the user, and a reference value 1 for a frequency of occurrence of peak traffic |
| $o_{u2}$ | A value defined by the user, and a reference value 2 for a frequency of occurrence of peak traffic |
| $v_u$ | A value defined by the user, and a reference value for the amount of traffic at a time point l |

Figure 7:
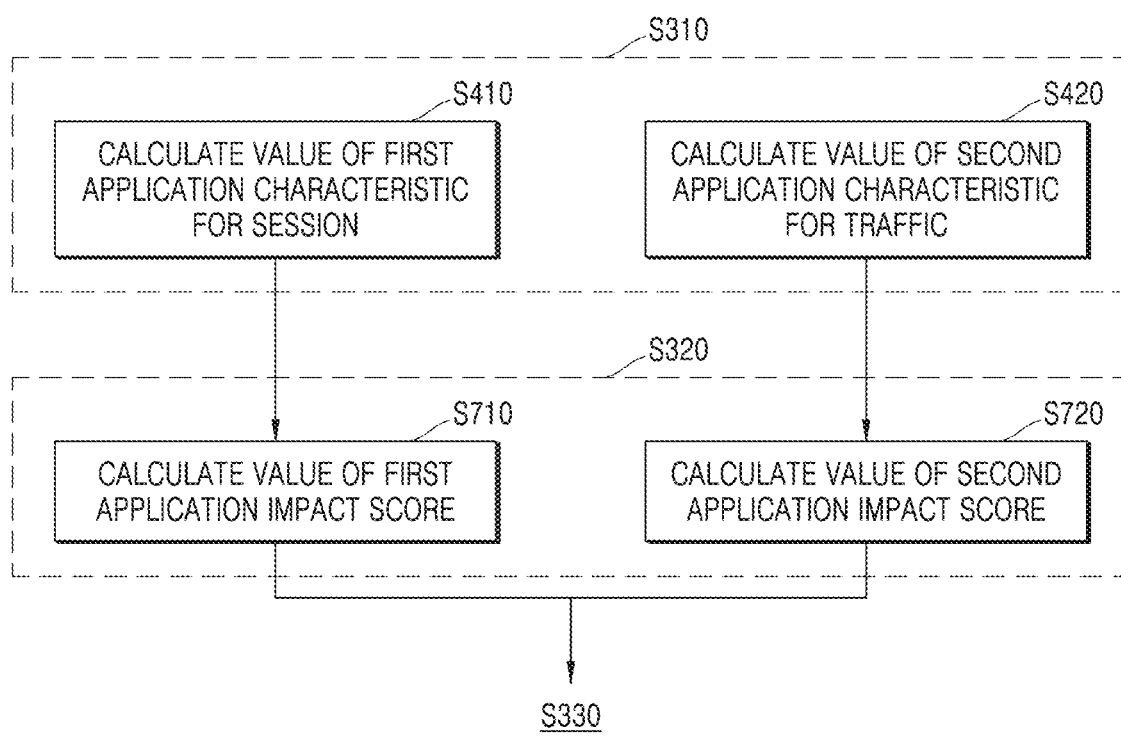
FIG. 7 is a flowchart illustrating some examples of operation S320 of FIG. 3.

FIG. 7 is a flowchart illustrating some examples of operation S320 of FIG. 3.

Referring to FIG. 7, operation S320 of FIG. 3 may include operations S710 and S720 of FIG. 7. Operations S710 and S720 may be performed in parallel. In embodiments, operations S710 and S720 may be sequentially performed.

An operation of calculating a value of the first application impact score corresponding to the first application characteristic calculated in operation S410 is performed (S710). The first application impact score may be calculated for each load balancing algorithm. For example, the first application impact score may include a first impact score (e.g., $A_s^T$) and/or a second impact score (e.g., $A_s^C$). Specifically, referring to Table 3, for example, the first application impact scores of the IP hash method (e.g., $A_1$) may include the first and second impact scores (e.g., $A_1^T$ and $A_1^C$).

An operation of calculating a value of the second application impact score corresponding to the second application characteristic calculated in operation S420 is performed (S720). The second application impact score may be calculated for each load balancing algorithm. For example, the second application impact score may include a third impact score (e.g., $A_s^M$) and/or a fourth impact score (e.g., $A_s^P$). Specifically, referring to Table 3, for example, the second application impact scores of the IP hash method (e.g., $A_1$) may include the third and fourth impact scores (e.g., $A_1^M$ and $A_1^P$).

In embodiments, if the higher the level of a specific application characteristic, the better the load balancing of a specific load balancing algorithm, the value of the application impact score may be calculated as a positive value. If the lower the level of a specific application characteristic, the better the load balancing of a specific load balancing algorithm, the value of the application impact score may be calculated as a negative value. Meanwhile, if a specific load balancing algorithm is independent of a specific application characteristic, the value of the application impact score may be calculated as a neutral value. For example, the positive value may be "1", the negative value may be "−1", and the neutral value may be "0". However, embodiments are not limited thereto.

Referring to Table 3, for example, load balancing according to the IP hash method (e.g., IP hash method $A_1$) may be performed better as the session time level is higher. Accordingly, the value of the first impact score (e.g., $A_1^T$) with respect to the IP hash method may be "1". Load balancing according to the IP hash method may be better performed as the session number level is lower. The value of the second impact score (e.g., $A_1^C$) with respect to the IP hash method may be "−1". Meanwhile, load balancing according to the IP hash method is independent of the traffic level, and may be performed better as the peak traffic level is lower. Therefore, the value of the third impact score (e.g., $A_1^M$) on the IP hash method may be "0", and the value of the third impact score (e.g., $A_1^P$) on the IP hash method may be "−1". In other words, the first and second application impact scores of the IP hash method (e.g., $(A_1^T, A_1^C, A_1^M, A_1^P)$) may be "(1, −1, 0, −1).

Referring to Table 3, for example, load balancing according to the least connection method (e.g., $A_2$) may be performed better as the session time level is higher. In addition, load balancing according to the least connection method may be independent of the session number level, the traffic level, and the peak traffic level. Therefore, the first and second application impact scores (e.g., $(A_1^T, A_1^C, A_1^M, A_2^P)$) of the least connection method may be "(1, 0, 0, 0)".

For another example, the load balancing according to the random method may be performed better as the session time level is lower. In addition, load balancing according to the random method may be independent of the session number level, traffic level, and peak traffic level. Accordingly, the impact scores of the first and second applications of the random method may be "(−1, 0, 0, 0)".

Figure 8:
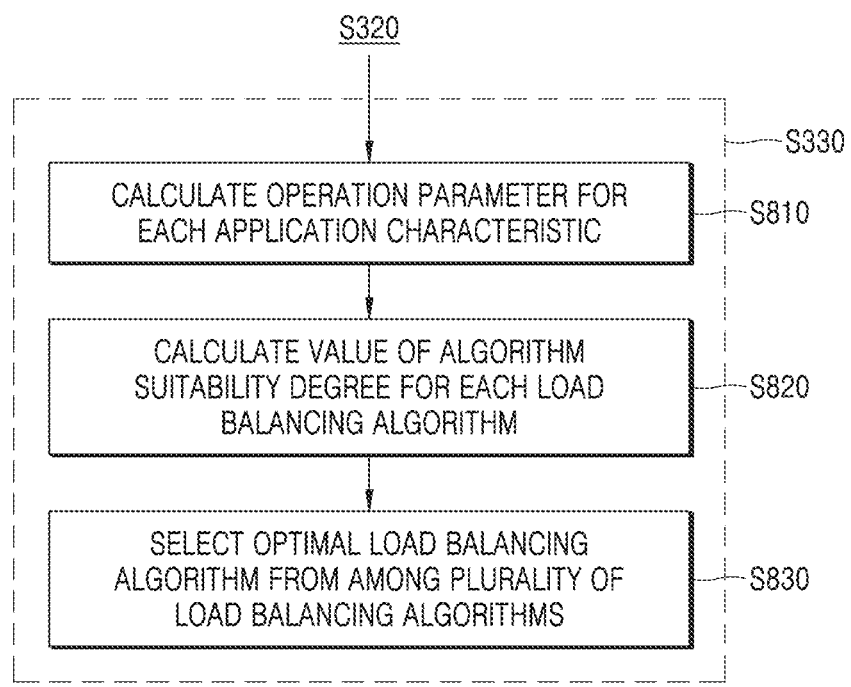
FIG. 8 is a flowchart illustrating some examples of operation S330 of FIG. 3.

FIG. 8 is a flowchart illustrating some examples of operation S330 of FIG. 3.

Referring to FIG. 8, operation S330 of FIG. 3 may include operations S810, S820 and S830 of FIG. 8.

An operation of calculating an operation parameter for each application characteristic is performed (S810). For example, the algorithm optimizing module 132 may calculate operation parameters for each application characteristic by using application characteristics and application impact scores corresponding to each other.

In embodiments of operation S810, the application characteristics of the application i may include a session time level $T_i$, a session number level $C_i$, a traffic level $M_i$, and/or a peak traffic level $P_i$. Meanwhile, the application impact scores in which application characteristics (e.g., $T_i$, $C_i$, $M_i$, and/or $P_i$) of application i impact load balancing algorithms s may include first to fourth impact scores $A_s^T$, $A_s^C$, $A_s^M$, and/or $A_s^P$. A first operation parameter may be a product $A_s^T \cdot T_i$ of a session time level $T_i$ and a first impact score $A_s^T$. A second operation parameter may be a product $A_s^C \cdot C_i$ of a session number level $C_i$ and a second impact score $A_s^C$. A third operation parameter may be a product $A_s^M \cdot M_i$ of a traffic level $M_i$ and a third impact score $A_s^M$. A fourth operation parameter may be a product $A_s^P \cdot P_i$ of a peak traffic level $P_i$ and a fourth impact score $A_s^P$.

An operation of calculating a value of the algorithm suitability for each load balancing algorithm is performed (S820). The algorithm suitability degree may be a parameter indicating whether each load balancing algorithm is suitable for an application (e.g., application i). For example, the algorithm optimizing module 132 may calculate the value of algorithm suitability for each load balancing algorithm by using a plurality of operation parameters.

In embodiments of operation S820, the plurality of operation parameters for the application i and the load balancing algorithm s may include first to fourth operation parameters (e.g., $A_s^T \cdot T_i$, $A_s^C \cdot C_i$, $A_s^M \cdot M_i$, and/or $A_s^P \cdot P_i$). The algorithm suitability degree for application i and load balancing algorithm s may be calculated as the sum of a plurality of operation parameters as shown in Equation 9 below. However, embodiments are not limited thereto, and the algorithm suitability degree may be calculated by other calculation methods, such as product of the plurality of operation parameters.

$$W_{i,s} = A_s^T \cdot T_i + A_s^C \cdot C_i + A_s^M \cdot M_i + A_s^P \cdot P_i \qquad \text{[Equation 9]}$$

Referring to Table 3, for example, the application impact scores (e.g., $A_1^T, A_1^C, A_1^M$, and $A_1^P$) of the IP hash method (e.g., $A_1$) are "(1, −1, 0, −1)". Therefore, the algorithm suitability degree (e.g., $W_{i,1}$) for the application i and the IP hash method may be "$T_i - C_i - P_i$".

Referring to Table 3, for example, the application impact scores (e.g., $A_2^T, A_2^C, A_2^M$, and $A_2^P$) of the least connection method (e.g., $A_2$) are "(1, 0, 0, 0)". Therefore, the algorithm suitability degree (e.g., $W_{i,2}$) for the application i and the least connection method may be "$T_i$".

An operation of selecting an optimal load balancing algorithm from among the plurality of load balancing algorithms is performed (S830). For example, the algorithm optimizing module 132 may select the optimal load balancing algorithm from among the plurality of load balancing algorithms based on a plurality of algorithm suitability degrees. Hereinafter, embodiments of selecting an optimal load balancing algorithm from among a plurality of load balancing algorithms by using a plurality of algorithm suitability degrees will be described later.

Figure 9A:
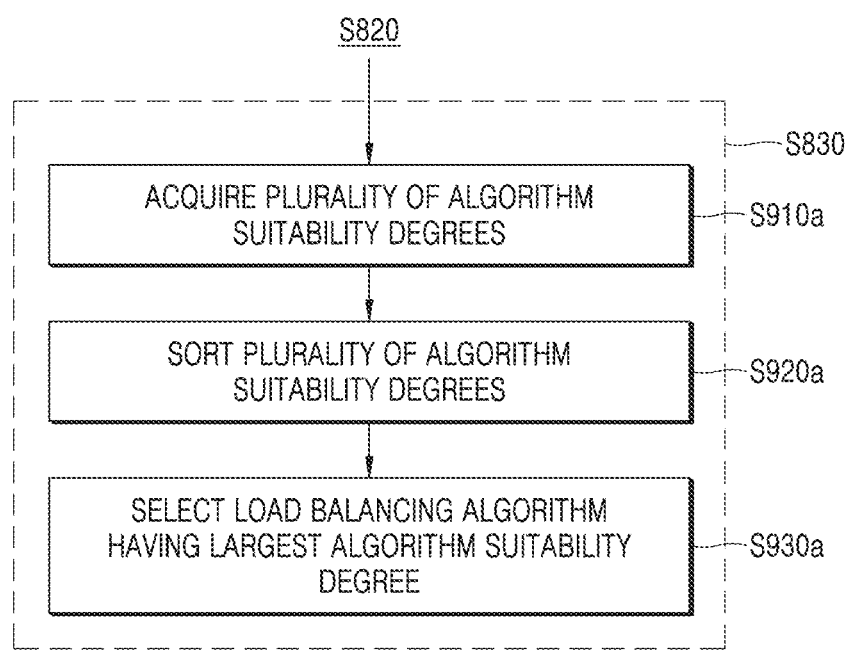
FIGS. 9A and 9B are flowcharts illustrating some examples of operation S830 of FIG. 8.
Figure 9B:
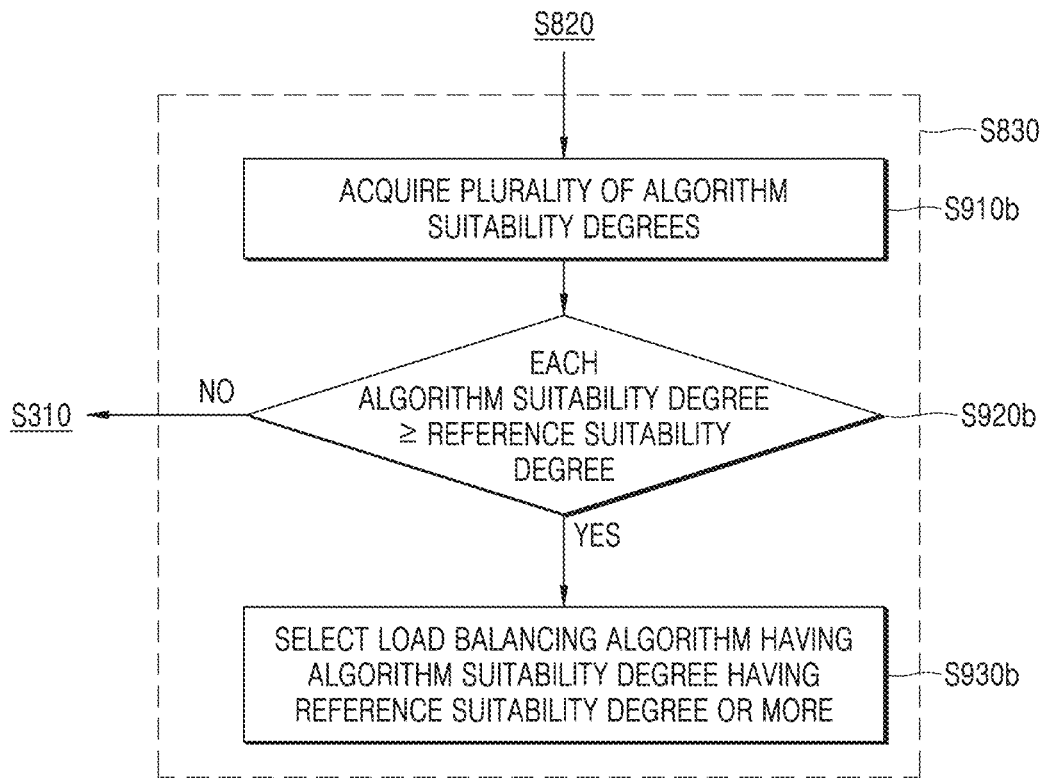

FIGS. 9A and 9B are flowcharts illustrating some examples of operation S830 of FIG. 8.

Referring to FIG. 9A, operation S830 of FIG. 8 may include operations S910a, S920a and S930a of FIG. 9A.

An operation of acquiring a plurality of algorithm suitability degrees is performed (S910a). Referring to Table 2, Table 3, and FIG. 8, for example, the algorithm suitability degree (e.g., $W_{i,1}$) for application i and IP hash methods (e.g., $A_1$), the algorithm suitability degree (e.g., $W_{i,2}$) for application i and least connection method (e.g., $A_2$), the algorithm suitability degree (e.g., $W_{i,j}$) for application i and round Robin method (e.g., $A_j$), and the like may be calculated according to Equation 9.

An operation of sorting a plurality of algorithm suitability degrees is performed (S920a). For example, the sorting method may be in ascending or descending order, but is not limited thereto. Specifically, the algorithm suitability degree (e.g., $W_{i,1}$) for application i and IP hash methods (e.g., $A_1$), the algorithm suitability degree (e.g., $W_{i,2}$) for application i and least connection method (e.g., $A_2$), the algorithm suitability degree (e.g., $W_{i,j}$) for application i and round Robin method (e.g., $A_j$), and the like may be sorted in descending order.

An operation of selecting a load balancing algorithm having the greatest algorithm suitability degree is performed (S930a). Specifically, for example, the greatest algorithm suitability degree from among a plurality of algorithm suitability degrees (e.g., $W_{i,1}$, $W_{i,2}$, and $W_{i,j}$) sorted in descending order may be acquired. In addition, a load balancing algorithm with the greatest algorithm suitability degree may be selected as an optimal load balancing algorithm.

Referring to FIG. 9B, operation S830 of FIG. 8 may include operations S910b, S920b and S930b of FIG. 9B. The operation S910b may be the same as (or similar to) the operation S910a.

An operation of checking whether any of the acquired algorithm suitability degrees is equal to or greater than a reference suitability degree is performed (S920b). The algorithm optimizing module 132 may check whether each of the plurality of algorithm suitability degrees (e.g., $W_{i,1}$. $W_{i,2}$, and $W_{i,j}$) is not less than reference suitability. The value of the reference suitability may be preset (or alternatively, given), and the value of the reference suitability may be set to be higher in order to more accurately select the optimal load balancing algorithm.

If there is an algorithm suitability degree not less than the reference suitability (S920b, for example), an operation of selecting a load balancing algorithm with an algorithm suitability degree not less than the reference suitability as the optimal load balancing algorithm is performed (S930b). According to embodiments, operation S930b may involve selecting any of the load balancing algorithms having an algorithm suitability degree greater than or equal to the reference suitability (e.g., selecting a first load balancing algorithm, randomly selecting the load balancing algorithm, etc.). According to embodiments, operation S930b may involve performing the operations of S920a and/or S930a with respect to the load balancing algorithms having an algorithm suitability degree greater than or equal to the reference suitability.

If there is no algorithm suitability degree greater than or equal to the reference suitability degree (NO in S920b), operation S310 may be performed (e.g., the method may return to operation S310).

Figure 10:
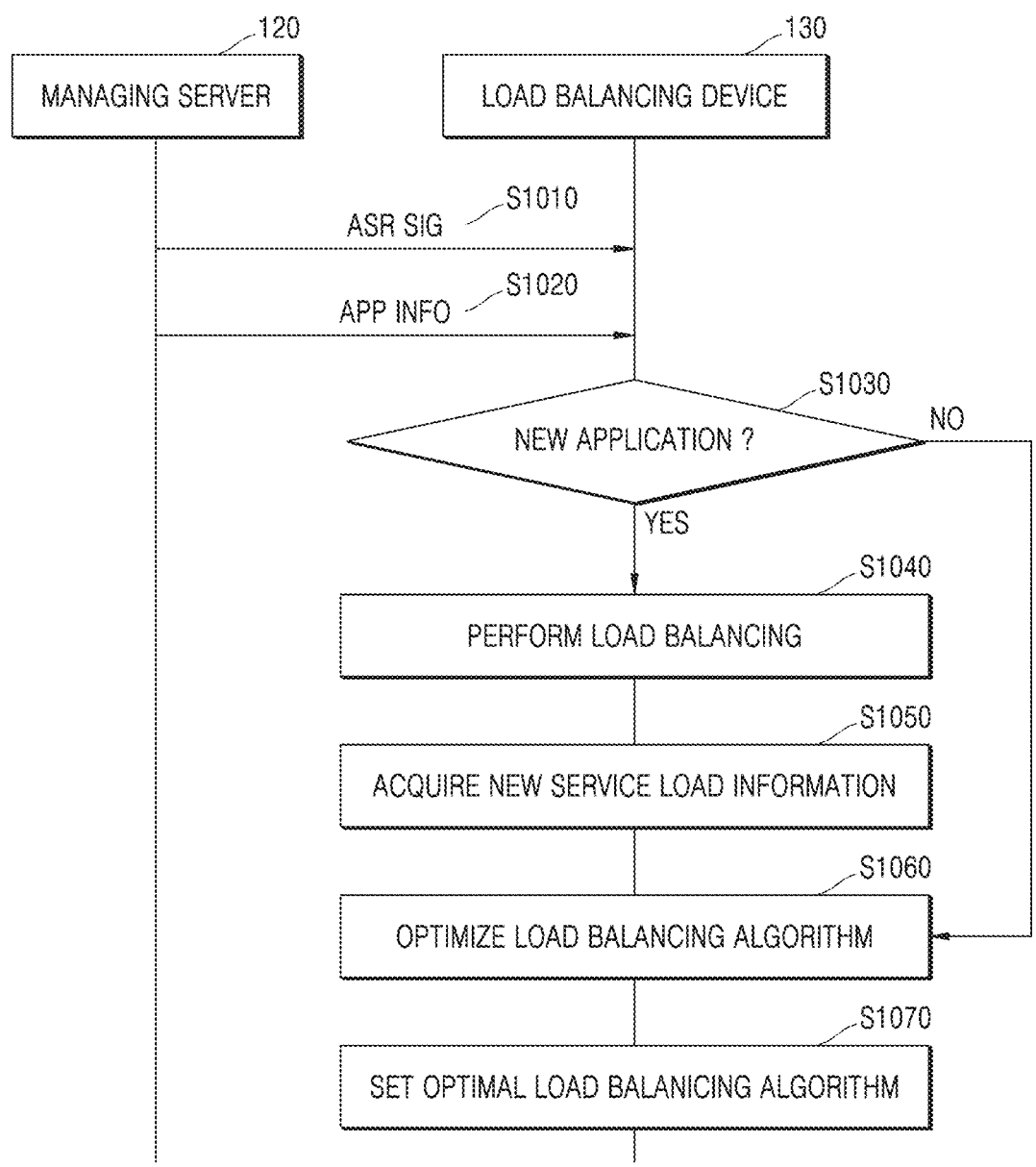
FIG. 10 is a flowchart illustrating a method of providing an optimal (or suitable) load balancing algorithm according to embodiments.

FIG. 10 is a flowchart illustrating a method of providing an optimal load balancing algorithm according to embodiments.

Referring to FIG. 10, operation S1010 may be the same as (or similar to) operation S210 of FIG. 2.

In operation S1020, the managing server 120 may transmit, to the load balancing device 130, application information APP INFO on the application. In embodiments, the managing server 120 may transmit the application information APP INFO along with the load balancing service request signal ASR SIG.

In operation S1030, the load balancing device 130 may receive the load balancing service request signal ASR SIG and the application information APP INFO. In addition, the load balancing device 130 may check whether the application included in the application information APP INFO is a new application. The new application of the inventive concepts may be an application that has never been serviced by system 10. According to embodiments, checking whether the application included in the application information APP INFO may include determining whether service load information for the application included in the application information APP INFO has previously been stored in the memory module 131.

If the application included in Application Information APP INFO is a new application (Yes in S1030, for example), it may be difficult to optimize the load balancing algorithm according to the characteristics of the new application because there is no service load information for the new application (e.g., no service load information for the new application stored in the memory module 131). Therefore, in operation S1040, the load balancing device 130 may perform load balancing (e.g., in response to determining the application included in the application information APP INFO is a new application) for the new application according to an arbitrary load balancing algorithm (e.g., a default load balancing algorithm, a randomly selected load balancing algorithm, etc.). The arbitrary load balancing algorithm may be any one of a plurality of load balancing algorithms previously stored (e.g., load balancing algorithms included in second list information). The operation S1040 may be performed for a predetermined (or alternatively, given) period, for example, 24 hours, but the predetermined (or alternatively, given) period is not limited to 24 hours.

In operation S1050, the load balancing device 130 may obtain new service load information for the new application. The new service load information may be generated as a result of the new application being serviced to the system 10 and load balancing (e.g., corresponding to the new application) performed according to any load balancing algorithm. In embodiments of operation S1050, the new service load information may be stored in the load balancing device 130. For example, the new service load information may be stored in the memory module 131.

In operation S1060, the load balancing device 130 may optimize the load balancing algorithm based on new service load information, first list information, and/or second list information. The operation S1060 according to embodiments may be performed according to the method illustrated in FIG. 3. According to embodiments, if the application included in Application Information APP INFO is not a new application (No in S1030, for example), the method may proceed to operation S1060, without performing operations S1040 and S1050, and perform operation S1060 based on the service load information for the existing application stored in the load balancing device (e.g., the memory model 131). In operation S1070, a load balancing algorithm optimized for a new application may be provided (e.g., set).

Figure 11:
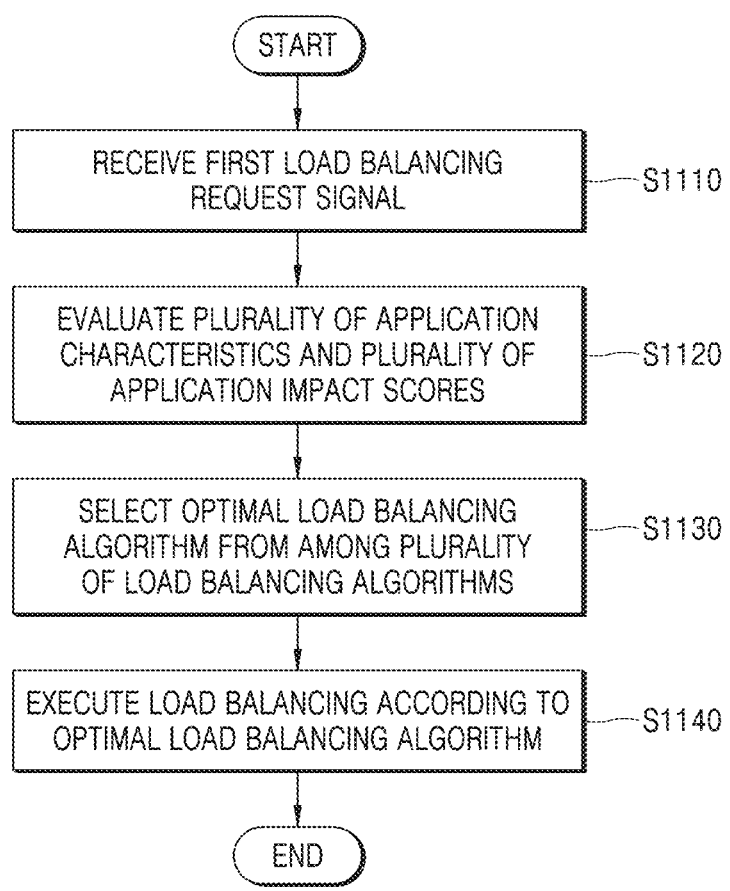
FIG. 11 is a flowchart illustrating a method of operating a load balancing apparatus according to embodiments.

FIG. 11 is a flowchart illustrating a method of operating a load balancing apparatus according to embodiments.

Referring to FIGS. 1 and 11, an operation of receiving a first load balancing service request signal from the managing server 120 is performed (S1110).

An operation of evaluating a plurality of application characteristics and a plurality of application impact scores for a first application is performed based on first service load information, first list information, and/or second list information for the first application (S1120). The plurality of application impact scores may indicate a degree in which each of the plurality of application characteristics impacts on each load balancing algorithm.

Based on the values of the plurality of application characteristics and the plurality of application impact scores, an operation of selecting an optimal load balancing algorithm from among the plurality of load balancing algorithms is performed (S1130). In embodiments for operation S1130, the optimal load balancing algorithm may be selected as described above with reference to FIGS. 3, 8, 9A, and 9B.

In embodiments for operation S1130, any one of the static load balancing algorithms and/or the dynamic load balancing algorithms may be selected as the optimal load balancing algorithm.

An operation of executing load balancing according to the optimal load balancing algorithm is performed (S1140).

Figure 12:
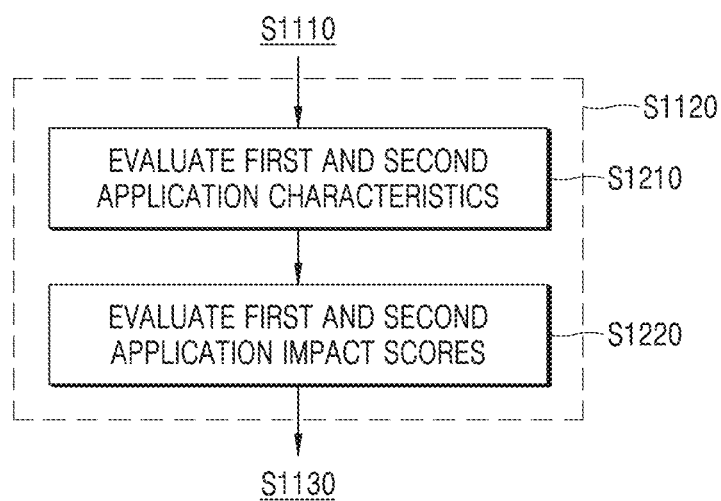
FIG. 12 is a flowchart illustrating some examples of operation S1120 of FIG. 11.

FIG. 12 is a flowchart illustrating some examples of operation S1120 of FIG. 11.

Referring to FIG. 12, operation S1120 of FIG. 11 may include operations S1210 and S1220 of FIG. 12.

An operation of evaluating a first application characteristic for a session and a second application characteristic for traffic is performed by using the first service load information (S1210). The first application characteristic may be calculated according to embodiments described above with reference to FIG. 5. The second application characteristic may be calculated according to embodiments described above with reference to FIG. 6.

For each load balancing algorithm, an operation of evaluating a first application impact score corresponding to the first application characteristic and a second application impact score corresponding to the second application characteristic are performed (S1220). The first application impact score and the second application impact score may be calculated according to embodiments described above with reference to FIG. 7.

Figure 13:
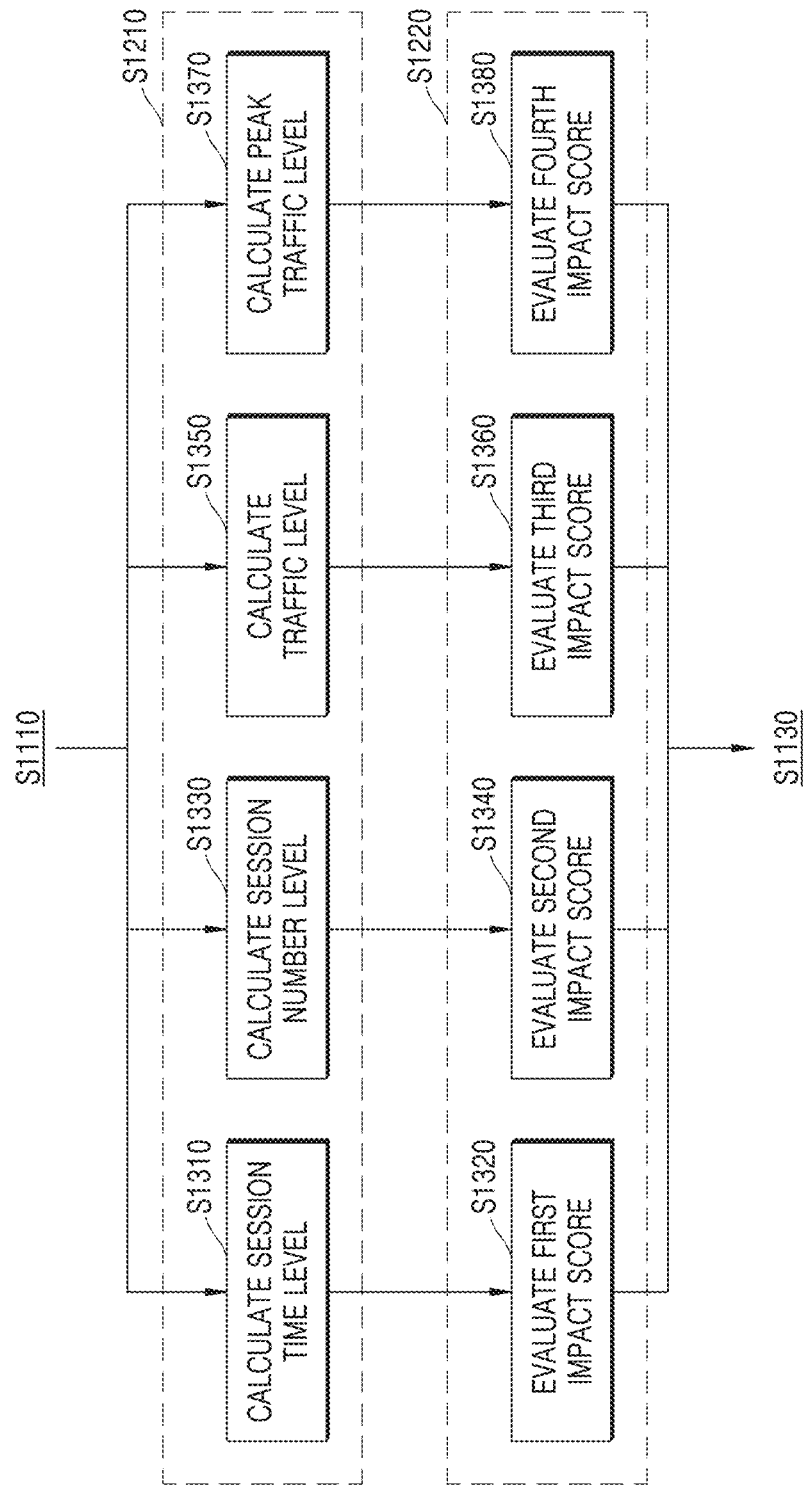
FIG. 13 is a flowchart illustrating some examples of operations S1210 and S1220 of FIG. 12.

FIG. 13 is a flowchart illustrating some examples of operations S1210 and S1220 of FIG. 12.

Referring to FIG. 13, operation S1210 of FIG. 12 may include operations S1310, S1330, S1350, and/or S1370 of FIG. 13. Operation S1310 of FIG. 13 may be the same as (or similar to) operation S510 of FIG. 5, operation S1330 of FIG. 13 may be the same as (or similar to) operation S520 of FIG. 5, operation S1350 of FIG. 13 may be the same as (or similar to) operation S610 of FIG. 6, and operation S1370 of FIG. 13 may be the same as (or similar to) operation S620 of FIG. 6. Meanwhile, the first service load information may include: a total number of servers capable of executing the first application; a number of entire sessions for a predetermined (or alternatively, given) time period; a total amount of traffic for the predetermined (or alternatively, given) time period; an amount of traffic at a specific time, a maximum (or highest) number of sessions at a time when peak traffic occurs; and/or a session time of each session.

Operation S1220 of FIG. 12 may include operations S1320, S1340, S1360, and/or S1380 of FIG. 13.

An operation of evaluating first impact scores of the session time level impacting on each of the plurality of load balancing algorithms is performed (S1320). The first impact score may be, for example, $A_S^T$ described as an example with reference to Table 3 and FIG. 7.

An operation of evaluating second impact scores of the session number level impacting on each of the plurality of load balancing algorithms is performed (S1340). The second impact score may be, for example, $A_S^C$ described as an example with reference to Table 3 and FIG. 7.

An operation of evaluating third impact scores of the traffic level impacting on each of the plurality of load balancing algorithms is performed (S1360). The third impact score may be, for example, $A_S^M$ described as an example with reference to Table 3 and FIG. 7.

An operation of evaluating fourth impact scores of the peak traffic level impacting on each of the plurality of load balancing algorithms is performed (S1380). The fourth impact score may be, for example, $A_S^P$ described as an example with reference to Table 3 and FIG. 7.

Figure 14:
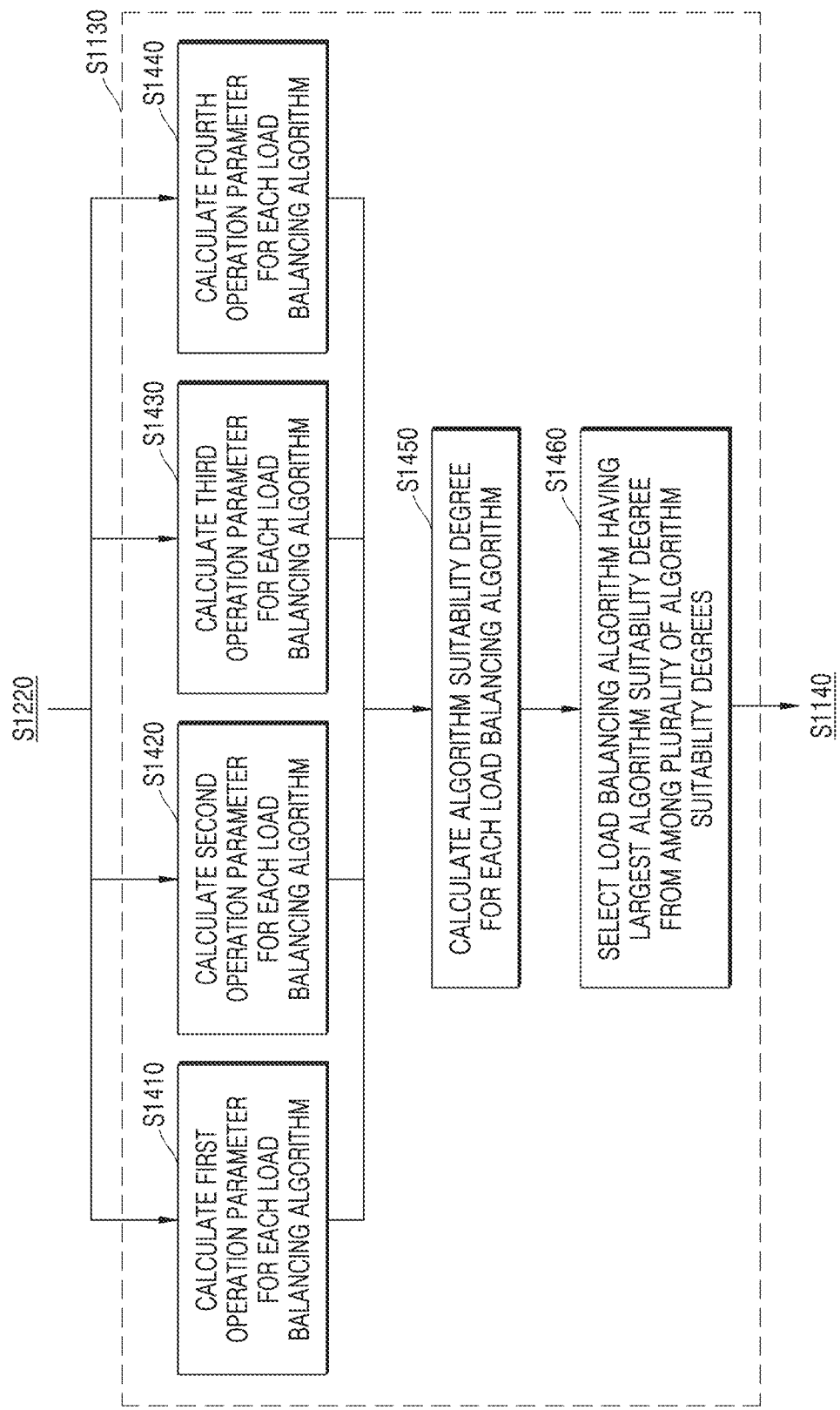
FIG. 14 is a flowchart illustrating some examples of operation S1130 of FIG. 11.

FIG. 14 is a flowchart illustrating some examples of operation S1130 of FIG. 11.

Referring to FIG. 14, operation S1130 of FIG. 11 may include operations S1410, S1420, S1430, S1440, S1450, and/or S1460 of FIG. 14.

An operation of calculating a first operation parameter for each load balancing algorithm by using the session time level and the first impact score of each load balancing algorithm is performed (S1410). The first operation parameter may be the product $A_S^T \cdot T_i$ of the session time level $T_i$ and the first impact score $A_S^T$, which are described as an example with reference to FIG. 8.

An operation of calculating a second operation parameter for each load balancing algorithm by using the session number level and the second impact score of each load balancing algorithm is performed (S1420). The second operation parameter may be the product $A_S^C \cdot C_i$ of the session number level $C_i$ and the second impact score $A_S^C$, which are described as an example with reference to FIG. 8.

An operation of calculating a third operation parameter for each load balancing algorithm by using the traffic level and the third impact score of each load balancing algorithm is performed (S1430). The third operation parameter may be the product $A_S^M \cdot M_i$ of the traffic level $M_i$ and the third impact score $A_S^M$, which are described as an example with reference to FIG. 8.

An operation of calculating a fourth operation parameter for each load balancing algorithm by using the peak traffic level and the fourth impact score of each load balancing algorithm is performed (S1440). The fourth operation parameter may be the product $A_S^P \cdot P_i$ of the peak traffic level $P_i$ and the fourth impact score $A_S^P$, which are described as an example with reference to FIG. 8.

An operation of calculating the algorithm suitability degree of each load balancing algorithm for each load balancing algorithm based on the first to fourth operation parameters of each load balancing algorithm is performed (S1450). In embodiments of operation S1450, the suitability of each algorithm may be calculated as a value acquired by summing the first to fourth operation parameters. For example, each algorithm suitability degree may be calculated according to Equation 9.

An operation of selecting, as the optimal load balancing algorithm, a load balancing algorithm having the highest algorithm suitability degree from among a plurality of algorithm suitability degrees. Operation S1460 may correspond to operations S910a, S920a, and/or S930a of FIG. 9A. In embodiments of operation S1460, if there are two or more load balancing algorithms with the highest suitability, any one of the two or more load balancing algorithms with the highest suitability may be arbitrarily (e.g., randomly) selected.

Figure 15:
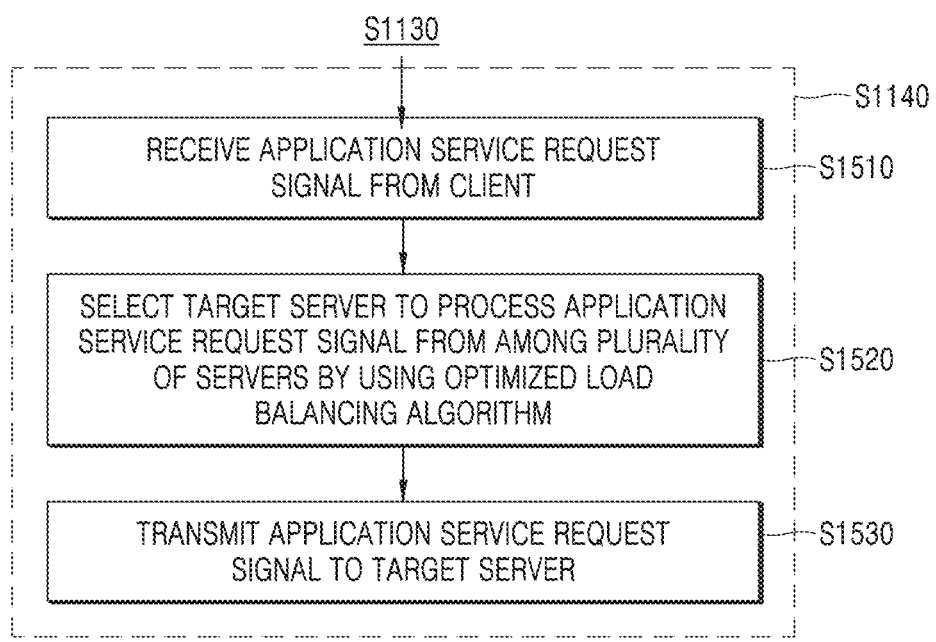
FIG. 15 is a flowchart illustrating some examples of operation S1140 of FIG. 11.

FIG. 15 is a flowchart illustrating some examples of operation S1140 of FIG. 11.

Referring to FIG. 15, operation S1140 of FIG. 11 may include operations S1510, S1520 and S1530 of FIG. 15.

An operation of receiving an application service request signal from a client is performed (S1510).

An operation of selecting a target server (e.g., optimal server) to process the application service request signal from among a plurality of servers by using the optimal load balancing algorithm is performed (S1520).

An operation of transmitting the application service request signal to the target server is performed (S1530).

Figure 16:
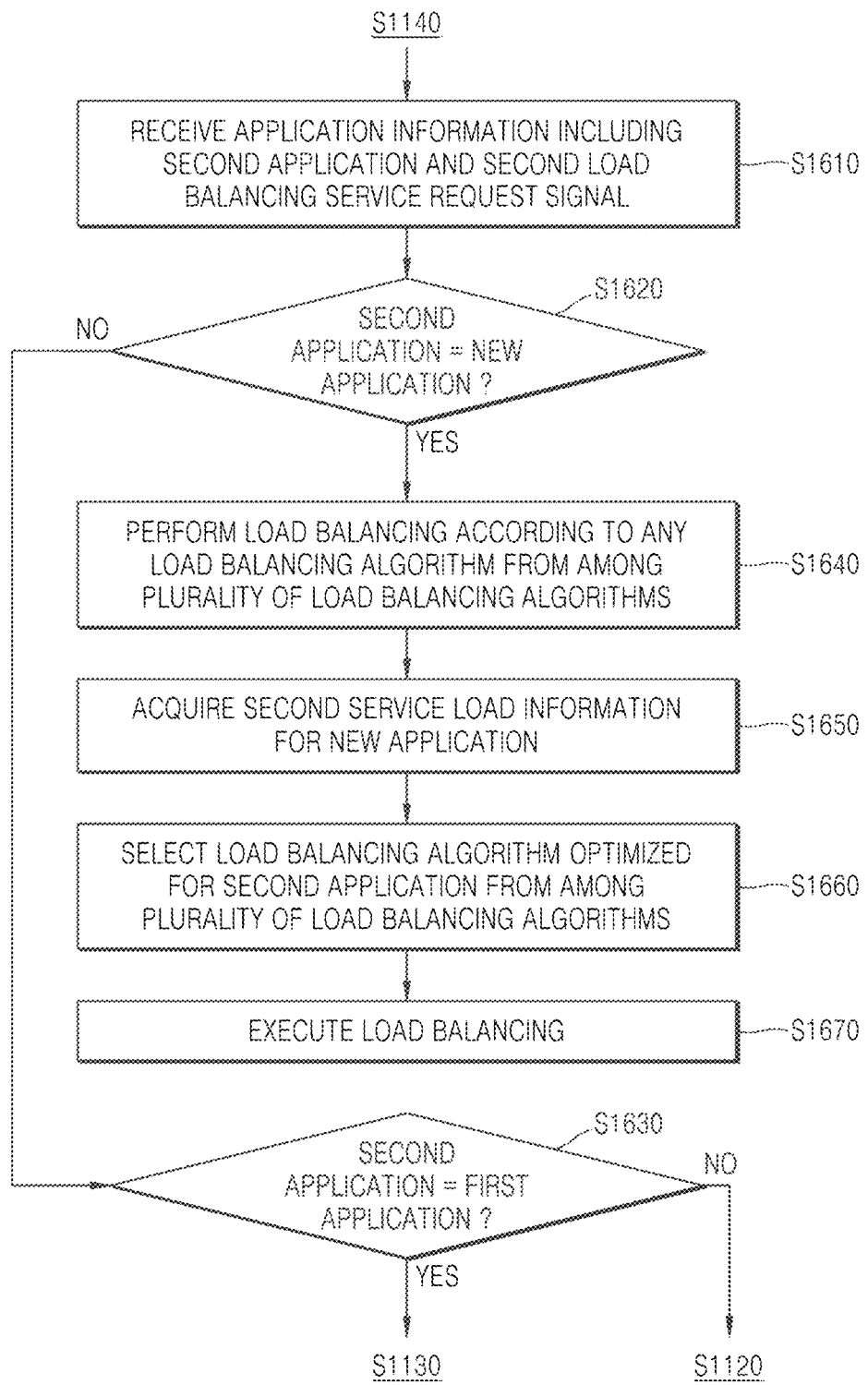
FIG. 16 is a flowchart illustrating some examples of the operation method of FIG. 11.

FIG. 16 is a flowchart illustrating some examples of the operation method of FIG. 11.

Referring to FIG. 16, the operation method shown in FIG. 11 may further include operations S1610, S1620, S1630, S1640, S1650, S1660, and S1670 of FIG. 16.

An operation of receiving application information including a second application and a second load balancing service request signal is performed (S1610). In embodiments, the second application may be the same as (or similar to) the first application currently serviced by the system 10. In embodiments, the second application may be different from the first application, but may already be known to the system 10. In embodiments, the second application may be a new application unknown to the system 10.

An operation of checking whether the second application is a new application is performed (S1620).

If the second application is not a new application (NO in S1620), an operation of checking whether the second application is the first application is performed (S1630).

If the second application is the first application (YES in S1630), a load balancing algorithm optimized for the first application may have been already set. Accordingly, operation S1130 may be performed.

If the second application is different from the first application (No in S1630), a load balancing algorithm optimized for the second application should be determined, and thus operation S1120 may be performed.

Meanwhile, if the second application is a new application (YES in S1620), an operation of performing load balancing according to one of the plurality of load balancing algorithms is performed for the new application (S1640). Operation S1640 may correspond to operation S1040 of FIG. 10.

An operation of acquiring the second service load information for the new application is performed (S1650). Operation S1650 may correspond to operation S1050 of FIG. 10.

Based on the second service load information, the first list information, and/or the second list information, an operation of selecting a load balancing algorithm optimized for the second application from among the plurality of load balancing algorithms is performed (S1660). Operation S1660 may correspond to operation S1060 of FIG. 10.

An operation of performing load balancing according to the load balancing algorithm optimized for the second application is performed (S1670). Operation S1670 may correspond to operations S1510, S1520, and S1530 of FIG. 15.

Meanwhile, embodiments may be implemented in the form of a recording medium that stores instructions executable by a computer. Instructions may be stored in the form of program code, and when executed by the processor, a program module may be generated to perform the operations of embodiments. The recording medium may be implemented as a non-transitory computer-readable recording medium.

Non-transitory computer-readable recording media include all kinds of recording media in which instructions that may be decoded by the computer are stored. For example, non-transitory computer-readable recording media may include read only memory (ROM), random access memory (RAM), magnetic tape, magnetic disk, flash memory, optical data storage, etc.

Conventional devices and methods for load balancing among servers perform load balancing based on a server state, communication network, etc., without consideration of an application to be served by a selected server. However, different applications to be served may have different characteristics relevant for selection of an effective load balancing algorithm. For instance, a most effective load balancing algorithm for a first application may be less effective for a second application by virtue of the differences between the characteristics of the first and second applications. Accordingly, the conventional devices and methods for load balancing rely on insufficiently effective load balancing algorithms resulting in, for example, excessive delay in processing of application requests across the servers.

However, embodiments provide improved devices and methods for load balancing. For example, the improved devices may determine a load balancing algorithm to be executed in determining a target server based on characteristics of an application to be served by the target server. Accordingly, the improved devices and methods overcome the deficiencies of the conventional devices and methods to at least improve the effectiveness of load balancing algorithms, and as a result, reduce delay in processing of application requests across servers.

According to embodiments, operations described herein as being performed by the system 10, the client 110, the managing server 120, the load balancing device 130, the server pool 140, the algorithm optimizing module 132, the algorithm execution module 133, the first server 141, the second server 142, and/or the Nth server 143 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium (e.g., the memory module 131). A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c." should be understood as including only a, only b, only c, both a and b, both a and c, both b and c, all of a, b, and c, or any variations of the aforementioned examples. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. A method comprising:
    calculating values of a plurality of application characteristics based on first service load information for a first application, the first service load information including at least one of,
        a total number of servers configured to execute the first application,
        a total number of sessions for a time period,
        a total amount of traffic for the time period,
        a maximum number of sessions at a time when peak traffic occurs,
        a session time of each session, or
        an amount of traffic at a specific time;
    evaluating a plurality of application impact scores for each of a plurality of load balancing algorithms, the plurality of application impact scores indicating a degree to which each of the plurality of application characteristics impacts each of the plurality of load balancing algorithms; and
    providing a first load balancing algorithm from among the plurality of load balancing algorithms based on the values of the plurality of application characteristics and the plurality of application impact scores.

2. The method of claim 1, further comprising:
    transmitting an application service request signal to a server selected according to the first load balancing algorithm from among a plurality of servers, the application service request signal being provided by a client.

3. The method of claim 1, wherein
    the plurality of application characteristics includes a first application characteristic related to a session and a second application characteristic related to traffic; and
    the calculating comprises:
        calculating a value of the first application characteristic using the first service load information; and
        calculating a value of the second application characteristic using the first service load information.

4. The method of claim 3, wherein
    the calculating of the value of the first application characteristic comprises:
        calculating a session time level based on the total number of sessions, the session times of each session, and at least one first reference value, the session time level indicating a time for maintaining a session as a level, and
        calculating a session number level based on the total number of servers, the total number of sessions, the maximum number of sessions at the time when peak traffic occurs, the total amount of traffic, and at least one second reference value, the session number level indicating a number of sessions per server as a level.

5. The method of claim 3, wherein
    the calculating of the value of the second application characteristic comprises:
        calculating a first traffic level based on the total number of sessions, the total amount of traffic, and at least one third reference value, the first traffic level indicating an amount of traffic per session as a level, and
        calculating a peak traffic level based on the first traffic level, the amount of traffic at the specific time, and at least one fourth reference value, the peak traffic level indicating a frequency of occurrence of peak traffic as a level.

6. The method of claim 3, wherein the evaluating comprises:
    calculating a first application impact score corresponding to the first application characteristic for each of the plurality of load balancing algorithms; and
    calculating a second application impact score corresponding to the second application characteristic for each of the plurality of load balancing algorithms.

7. The method of claim 1, wherein
    the plurality of load balancing algorithms comprise a static load balancing algorithm and a dynamic load balancing algorithm; and
    the providing of the first load balancing algorithm comprises providing one of the static load balancing algorithm or the dynamic load balancing algorithm as the first load balancing algorithm.

8. The method of claim 1, wherein the providing of the first load balancing algorithm comprises:
    performing first operations with respect to each respective load balancing algorithm among the plurality of load balancing algorithms to obtain a plurality of algorithm suitability degrees, the first operations including,
        calculating an operation parameter for each respective application characteristic among the plurality of application characteristics based on the respective application characteristic and a corresponding application impact score among the plurality of application impact scores to obtain a plurality of operation parameters, and
        calculating a respective algorithm suitability degree of the respective load balancing algorithm based on the plurality of operation parameters, the respective algorithm suitability degree indicating a degree to which the respective load balancing algorithm is suitable for the first application; and
    selecting the first load balancing algorithm from among the plurality of load balancing algorithms based on the plurality of algorithm suitability degrees.

9. The method of claim 8, wherein the selecting of the first load balancing algorithm comprises selecting a load balancing algorithm having a greatest algorithm suitability degree from among the plurality of algorithm suitability degrees as the first load balancing algorithm.

10. The method of claim 8, wherein the selecting of the first load balancing algorithm comprises selecting a load balancing algorithm having an algorithm suitability degree equal or greater than a reference value as the first load balancing algorithm.

11. The method of claim 1, further comprising:
determining whether a second application corresponding to received application information corresponds to stored service load information;
performing load balancing corresponding to the second application according to one among the plurality of load balancing algorithms in response to determining the second application does not correspond to the stored service load information;
acquiring second service load information for the second application; and
providing a second load balancing algorithm from among the plurality of load balancing algorithms based on the second service load information.

12. A device for performing load balancing, the device comprising:
processing circuitry configured to,
evaluate a plurality of application characteristics and a plurality of application impact scores for each of a plurality of load balancing algorithms based on first service load information for a first application, the first service load information including at least one of,
a total number of servers configured to execute the first application,
a total number of sessions for a time period,
a total amount of traffic for the time period,
a maximum number of sessions at a time when peak traffic occurs,
a session time of each session, or
an amount of traffic at a specific time,
provide a first load balancing algorithm from among the plurality of load balancing algorithms based on the plurality of application characteristics and the plurality of application impact scores, and
perform load balancing according to the first load balancing algorithm.

13. The device of claim 12, wherein
the plurality of application characteristics includes a first application characteristic related to a session and a second application characteristic related to traffic;
the plurality of application impact scores includes,
a first application impact score corresponding to the first application characteristic, and
a second application impact score corresponding to the second application characteristic; and
the processing circuitry is configured to:
calculate a value of the first application characteristic based on the first service load information,
calculate a value of the second application characteristic based on the first service load information; and
calculate for each of the plurality of load balancing algorithms,
the first application impact score, and
the second application impact score.

14. The device of claim 13, wherein
the processing circuitry is configured to:
calculate a session time level based on the total number of sessions, the session times of each sessions, and at least one first reference value, the session time level indicating a time for maintaining a session as a level,
calculate a session number level based on the total number of servers, the total number of sessions, the maximum number of sessions at the time when peak traffic occurs, the total amount of traffic, and at least one second reference value, the session number level indicating a number of sessions per server as a level,
calculate a first traffic level based on the total number of sessions, the total amount of traffic, and at least one third reference value, the first traffic level indicating an amount of traffic per session as a level, and
calculate a peak traffic level based on the first traffic level, the amount of traffic at the specific time, and at least one fourth reference value, the peak traffic level indicating a frequency of occurrence of peak traffic as a level.

15. The device of claim 12, wherein the processing circuitry is configured to:
perform first operations with respect to each respective load balancing algorithm among the plurality of load balancing algorithms to obtain a plurality of algorithm suitability degrees, the first operations including,
calculate an operation parameter for each respective application characteristic among the plurality of application characteristics based on the respective application characteristic and a corresponding application impact score among the plurality of application impact scores to obtain a plurality of operation parameters, and
calculate a respective algorithm suitability degree of the respective load balancing algorithm based on the plurality of operation parameters, the respective algorithm suitability degree indicating a degree to which the respective load balancing algorithm is suitable for the first application; and
select the first load balancing algorithm from among the plurality of load balancing algorithms based on the plurality of algorithm suitability degrees.

16. A system comprising:
a server group configured to process an application service in response to an application service request signal requesting a service provided through an application; and
a load balancing device configured to,
calculate a plurality of application characteristics and a plurality of application impact scores for each of a plurality of load balancing algorithms based on service load information about an application, the service load information including at least one of,
a total number of servers configured to execute the application,
a total number of sessions for a time period,
a total amount of traffic for the time period,
a maximum number of sessions at a time when peak traffic occurs,
a session time of each session, or
an amount of traffic at a specific time,
select a first load balancing algorithm from among the plurality of load balancing algorithms based on the plurality of application characteristics and the plurality of application impact scores,
perform load balancing according to the first load balancing algorithm, and
transmit the application service request signal to a target server of the server group.

17. The system of claim 16, wherein
the plurality of application characteristics includes a first application characteristic related to a session and a second application characteristic related to traffic;
the plurality of application impact scores includes,
   a first application impact score corresponding to the first application characteristic, and
   a second application impact score corresponding to the second application characteristic; and
the load balancing device is configured to:
   calculate a value of the first application characteristic based on the service load information,
   calculate a value of the second application characteristic based on the service load information, and
   calculate for each of the plurality of load balancing algorithms,
      the first application impact score, and
      the second application impact score.

18. The system of claim 17, wherein
the load balancing device is configured to
   calculate a session time level based on the total number of sessions, the session times of each of the sessions, and at least one first reference value, the session time level indicating a time for maintaining a session as a level,
   calculate a session number level based on the total number of servers, the total number of sessions, the maximum number of sessions at the time when peak traffic occurs, the total amount of traffic, and at least one second reference value, the session number level indicating a number of sessions per server as a level,
   calculate a first traffic level based on the total number of sessions, the total amount of traffic, and at least one third reference value, the first traffic level indicating an amount of traffic per session as a level, and
   calculate a peak traffic level based on the first traffic level, the amount of traffic at the specific time, and at least one fourth reference value, the peak traffic level indicating a frequency of occurrence of peak traffic as a level.

19. The system of claim 16, wherein the load balancing device is configured to:
   perform first operations with respect to each respective load balancing algorithm among the plurality of load balancing algorithms to obtain a plurality of algorithm suitability degrees, the first operations including,
      calculate an operation parameter for each respective application characteristic among the plurality of application characteristics based on the respective application characteristic and a corresponding application impact score among the plurality of application impact scores to obtain a plurality of operation parameters, and
      calculate a respective algorithm suitability degree of the respective load balancing algorithm based on the plurality of operation parameters, the respective algorithm suitability degree indicating a degree to which the respective load balancing algorithm is suitable for the application; and
   select a load balancing algorithm having a greatest algorithm suitability degree from among a plurality of algorithm suitability degrees as the first load balancing algorithm.

20. The system of claim 16, wherein
the application is a first application, and the service load information is first service load information; and
the load balancing device is configured to:
   receive application information and a load balancing service request signal for a second application, the second application not corresponding to stored service load information,
   perform load balancing according to one among the plurality of load balancing algorithms for a time period,
   store second service load information for the second application, and
   select a second load balancing algorithm from among the plurality of load balancing algorithms based on the second service load information.

* * * * *